May 26, 1959　　　P. THREADGOLD　　　2,888,664
TELEMETERING
Filed May 18, 1955
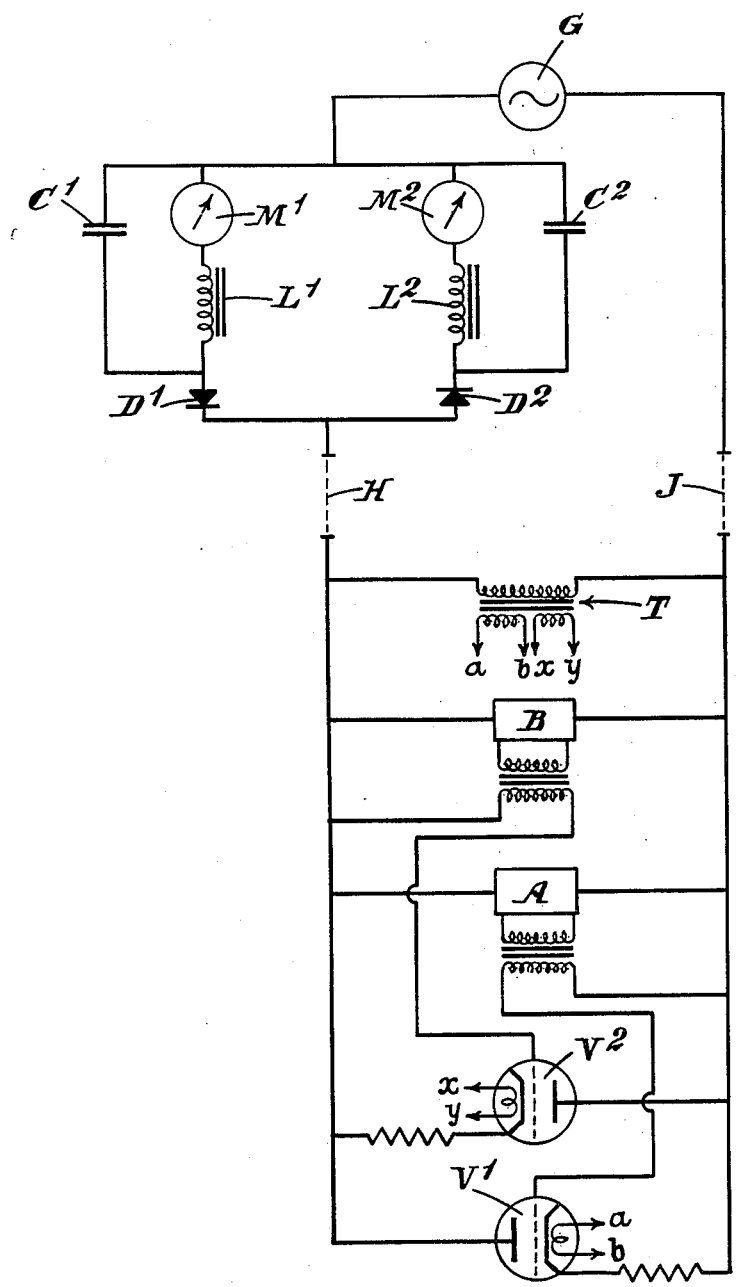
INVENTOR:
PHILIP THREADGOLD
BY
Morgan, Finnegan, Durham & Pine
ATTORNEYS

United States Patent Office 2,888,664
Patented May 26, 1959

2,888,664

TELEMETERING

Philip Threadgold, Kirklington Hall, England, assignor to The British Petroleum Company Limited, London, England, a British joint-stock corporation Application May 18, 1955, Serial No. 509,260

Claims priority, application Great Britain May 27, 1954

5 Claims. (Cl. 340—160)

This invention relates to telemetering by which is meant, generally, the reproduction at a convenient location of measurements made at a remote point.

According to the invention, a telemetering system for measuring the output signals of two A.C. energised electrical measuring networks comprises a line, consisting of a pair of conductors (one of which may be earth), between the measuring networks and the point where it is desired to receive the signals, the line being supplied with a substantially constant alternating voltage which energises the measuring networks the output signals of which are transformer fed to the grids of two valves, one signal to each, which are connected anode to cathode across the line at the same end as the measuring networks, means being provided at the receiving end of the line for separating and monitoring the positive and negative half cycles of the current flowing in the line.

The positive and negative half cycles of current may be monitored by D.C. meters provided with choke/capacity filters to by-pass any A.C. ripple. It will be seen that the readings on the meters will be proportional to the impedances of the valves which in turn are proportional to the output signals of the measuring networks.

The invention will now be described by way of example with reference to the accompanying drawing which is a simplified circuit diagram of the system.

The "line" or cable consists of conductors H and J (one of which may be earth), and is supplied with a constant alternating voltage by generator G which provides the supply to two four terminal measuring networks A and B and to a heater transformer T for two triode valves $V_1$ and $V_2$ which are connected across the line anode to cathode. The output signal from measuring network A is transformer fed to the control grid of valve $V_1$ and the output signal from measuring network B is transformer fed to the control grid of valve $V_2$.

The current flowing in the line follows different paths on alternate half cycles. On one half cycle it flows through valve $V_1$, D.C. meter $M_1$ and rectifier $D_1$. The current flowing on this half cycle is monitored by the meter $M_1$ which is provided with a choke/capacity filter ($L_1$, $C_1$) to by-pass any A.C. ripple. This current is proportional to the impedance of valve $V_1$ which in turn is proportional to the signal fed to its control grid from the four terminal network A. Similarly on the alternate half cycle the current flows through valve $V_2$, D.C. meter $M_2$ and rectifier $D_2$. This current is monitored by meter $D_2$, which is likewise provided with a filter ($L_2$, $C_2$), and is proportional to the impedance of valve $V_2$ which in turn is proportional to the signal fed to its control grid from the four terminal network B.

Meter $M_1$ thus gives a deflection proportional to the output signal from four terminal network A and meter $M_2$ gives a deflection proportional to the output signal from four terminal network B.

In the circuit as illustrated it will be seen that both of the meters $M_1$ and $M_2$ will indicate the standing (or zero signal) current through their respective circuits when the input grid signals to the valves $V_1$ and $V_2$ are both zero. If it is considered desirable, this zero signal current may be backed off by any form of standard compensation circuit for the meter concerned.

I claim:
1. A telemetering system for measuring the output signals of two A.C. energised electrical networks, comprising a line, consisting of a pair of conductors, between the measuring networks and the point where it is desired to receive the signals, the line being supplied with a substantially constant alternating voltage which energises the measuring networks, a pair of valves connected anode to cathode across the line at the same end as the measuring networks, a pair of transformers for feeding the output signals of the measuring networks to the control grids of the two valves, one signal to each, and means at the receiving end of the line for separating and monitoring the positive and negative half cycles of the current flowing in the line.

2. A telemetering system according to claim 1, in which one of the two conductors constituting the line is earth.

3. A telemetering system according to claim 1, comprising a pair of D.C. meters for monitoring the positive and negative half cycles of current and a pair of choke/capacity filters for by-passing any A.C. ripple round the D.C. meters.

4. A telemetering system according to claim 1, comprising means for backing off the standing current through the meters when the input grid signals to the valves are zero.

5. A telemetering system for measuring the output signals of two A.C. energized electrical networks comprising a line including at least two conductors between the measuring networks and the point where it is desired to receive the signals, means for supplying the line with a substantially constant alternating voltage for energizing said networks, at least two tubes each having a cathode, anode and grid, connections between the anode of one tube and the cathode of the other tube to one conductor and the cathode of one tube and the anode of the other tube to the other conductor, means between said line and said cathodes for heating the latter, transformer means for coupling each measuring network with a tube to modify the grid-cathode voltages and the plate currents in accordance with changes in the measuring networks, and means at the receiving end of the line for separating and monitoring the negative and positive half cycles of the current flowing in the line.

References Cited in the file of this patent

UNITED STATES PATENTS

| 1,311,650 | Johnson | July 29, 1919 |
| 1,672,005 | Sorenson | June 5, 1928 |
| 2,666,812 | Kircher | Jan. 19, 1954 |

FOREIGN PATENTS

| 400,289 | Great Britain | Oct. 26, 1933 |